US010095796B2

(12) United States Patent
Singh et al.

(10) Patent No.: US 10,095,796 B2
(45) Date of Patent: Oct. 9, 2018

(54) METHOD SYSTEM AND COMPUTER READABLE MEDIUM FOR DYNAMIC GAMIFICATION OVER A NETWORK

(71) Applicant: Infosys Limited, Bangalore (IN)

(72) Inventors: Anurag Singh, Bangalore (IN); Ashok Gopinath, Bangalore (IN); Saurabh Kumar, Lucknow (IN)

(73) Assignee: Infosys Limited, Bangalore (IN)

( * ) Notice: Subject to any disclaimer, the term of this patent is extended or adjusted under 35 U.S.C. 154(b) by 537 days.

(21) Appl. No.: 14/658,098

(22) Filed: Mar. 13, 2015

(65) Prior Publication Data
US 2015/0278158 A1    Oct. 1, 2015

(30) Foreign Application Priority Data
Mar. 27, 2014   (IN) .......................... 1630/CHE/2014

(51) Int. Cl.
| | |
|---|---|
| G06F 7/60 | (2006.01) |
| G06F 17/10 | (2006.01) |
| G06F 17/30 | (2006.01) |
| G06Q 50/00 | (2012.01) |
| A63F 13/355 | (2014.01) |
| A63F 13/67 | (2014.01) |
| G06F 17/50 | (2006.01) |

(52) U.S. Cl.
CPC ...... *G06F 17/30873* (2013.01); *A63F 13/355* (2014.09); *A63F 13/67* (2014.09); *G06Q 50/01* (2013.01); *G06F 17/50* (2013.01); *G06F 2217/16* (2013.01)

(58) Field of Classification Search
None
See application file for complete search history.

(56) References Cited

U.S. PATENT DOCUMENTS

| | | | |
|---|---|---|---|
| 2012/0028713 A1 | 2/2012 | Driemeyer et al. | |
| 2012/0077596 A1 | 3/2012 | Ocko et al. | |
| 2012/0129610 A1 | 5/2012 | Mazursky et al. | |
| 2012/0142428 A1 | 6/2012 | Wilson et al. | |
| 2013/0311245 A1* | 11/2013 | Blackburn ....... | G06Q 10/06393 705/7.39 |
| 2013/0324201 A1* | 12/2013 | Eberlein .......... | G06Q 10/06311 463/7 |

(Continued)

OTHER PUBLICATIONS

Bista, Sanat Kumar et al., "Using Gamification in an Online Community", Oct. 14-17, 2012, 8th International Conference on Collaborative Computing Networking, Applications, and Worksharing, Collaboratecom, ICST.*

(Continued)

*Primary Examiner* — Cedric Johnson
(74) *Attorney, Agent, or Firm* — Klarquist Sparkman, LLP (57) ABSTRACT

The present invention describes a method of dynamic gamification over a network and comprises of the steps of creating a network of statistical models associated with a real life situation by using a processor, modifying a predefined parameter of a first statistical model by either a player or a moderator which triggers a modification subsequently in the other statistical models related to the first statistical model and deciding an outcome of the gamification in response to the modification of the first and the other statistical models.

26 Claims, 3 Drawing Sheets

(56) References Cited

U.S. PATENT DOCUMENTS

2014/0051506 A1* 2/2014 Ameling ............... G06Q 99/00
463/29
2014/0278818 A1* 9/2014 Falk ................. G06Q 10/06375
705/7.37

OTHER PUBLICATIONS

Paolucci, M. et al., "Towards a Living Earth Simulator", 2012, The European Physical Journal Special Topics, Springerlink.*
Herzig, Philipp et al., "GaML—A Modeling Language for Gamification", 2013, IEEE/ACM 6th International Conference on Utility and Cloud Computing, IEEE Computer Society.*

* cited by examiner

METHOD SYSTEM AND COMPUTER READABLE MEDIUM FOR DYNAMIC GAMIFICATION OVER A NETWORK

RELATED APPLICATION DATA

This application claims priority to India Patent Application No. 1630/CHE/2014, filed Mar. 27, 2014, the disclosure of which is hereby incorporated by reference in its entirety.

FIELD OF THE INVENTION

The present invention relates, in general to a social and dynamic gamification platform and its corresponding methods wherein the gamification platform is controlled by human moderation and drives to completion based on a cumulative interaction of the statistical models related to each other.

BACKGROUND

Interactive games enable players to interact with the host gaming system through a text or graphical interface. Through this system the player may play along with other players, as a team or against other player/s, teams or the system itself. Players play for a designated objective in a generally competitive story line.

Sometimes the system just provides a synchronized environment for multi-player gaming—where all players interact with a common representation of the environment at any given point of time. Other times system also participates in the game play through programmed artificial intelligence. The system intelligence may be distributed be across player's gaming console/client or may be hosted centrally. The system may represent itself by entities in the game story board or through events that alter player's virtual environment.

In a single player environment, game host and player client may be the same entities. The different players may be connected though the system by underlying networking infrastructure (e.g. cellular, internet or LAN/WAN). A new development in connected, interactive gaming is social games where the players play over a social network and their collective actions as well as system's intelligence is involved in the game play. Such games are real time but roll along for days or months as the game play is intermittent but the game always is in progress.

Gamification is one approach that can be utilized to create and enhance engagement of individuals and groups. Gamification refers to the application of game mechanics to engage users and to solve problems.

Other systems/processes/services known in the prior art are not focused on motivating and producing consistent activity that generates predictability and reliability together with a better interaction among participants. Existing systems are more focused toward providing deep engagement using computer graphics, artificial intelligence, competitive game format, and well defined player objectives. The effect is that there is a distinct virtual/artificial flavor to the game (even though it might be very engaging).

In strategy games the user engagement could be of a better intellectual quality (for example, educational, reflective, stimulating positive action in real world) if it could fashion real world (in a non-graphical sense also) to a greater degree. If relevant real world phenomena could be modeled naturally, there could be applications in Enterprise Gamification.

Through social media and a gamified process, the stakeholders are compelled, through the method and process of the present invention, to take specific action on a consistent basis that generates a measurable result and improves not only their bottom line but also their lifeline.

Definitions

GAMIFICATION is the use of game design techniques and game mechanics to solve problems and engage audiences.

PLAYER or USER is a user that is currently engaged in and using the method and/or system of the present invention.

SUMMARY

According to some embodiments of the invention, described is an approach to implement gamification for real life scenarios as well as applications. Gamification in this context refers to the application of game design principles and mechanics to application or real life scenario simulation and design. Gamification can be used to drive participation and engagement by users of an application.

Some embodiments of the invention are directed to an approach to create gamification for any scenario, which may include any activity or event. In some approaches, the invention is applied to provide gamification such that a scenario is not modified to include the game features. Instead, an external gamification mechanism is provided to include the game features, where the external gamification mechanism is used in conjunction with the activity/application. In this way the invention is applicable to any activity/application, without requiring costly rendering to include the game features. Moreover, this allows the invention to be applied to an activity and application where it would be difficult, expensive, or impractical to modify to include the game features.

Further details of aspects, objects, and advantages of the invention are described below in the detailed description, drawings, and claims. Both the foregoing general description and the following detailed description are exemplary and explanatory, and are not intended to be limiting as to the scope of the invention.

In a preferred embodiment of the present invention there is provided a method of dynamic gamification over a network, comprising the steps of creating a network of statistical models associated with a real life situation, using a processor; modifying a predefined parameter of a first statistical model by one of a player and a moderator, triggering a modification subsequently in the other statistical models related to the first statistical model; and deciding an outcome of the gamification in response to the modification of the first and the other statistical models.

In another embodiment of the present invention the statistical models comprise users and objects associated with the real-life scenario.

In yet another embodiment of the present invention the moderator is one of a user playing in the gamification platform and an external entity.

In further another embodiment of the present invention the moderator is provided an interface which allows modification of one or more parameters and relationship of the statistical models.

In another embodiment of the present invention the moderator changes the parameters of the statistical models based on the statistical and historical data in response to a notification from the system.

In further another embodiment of the present invention the users are connected to the system through a computer network.

In yet another embodiment of the present invention the changes made by the moderator, and gamification data is stored on a storage database, the storage database being associated with the computer network.

In another embodiment of the present invention the storing of gamification data is done on a local system when the system is offline.

In another embodiment of the present invention the locally stored data is synced with the gamification storage database upon reconnection to the server.

In another preferred embodiment of the present invention there is described system of dynamic gamification over a network, comprising of a modelling unit for creating a network of statistical models associated with a real life situation, using a processor, an interface for modifying a predefined parameter of a first statistical model by one of a player and a moderator, a processor configured to triggering a modification subsequently in the other statistical models related to the first statistical model and deciding an outcome of the gamification in response to the modification of the first and the other statistical models.

In yet another embodiment of the present invention, there is described a computer program product comprising a non-transitory computer-readable medium having a computer-readable program product embodied therein wherein the computer readable program product comprises program instruction means for, creating a network of statistical models associated with a real life situation, using a processor modifying a predefined parameter of a first statistical model by one of a player and a moderator triggering a modification subsequently in the other statistical models related to the first statistical model; and deciding an outcome of the gamification in response to the modification of the first and the other statistical models.

DETAILED DESCRIPTION

The invention provides a method, system, and computer program product for an invariant analysis to be performed on an application and used to detect silent failures using a combination of invariant violation analysis and finite state machine based analysis of the system.

Figure 1:
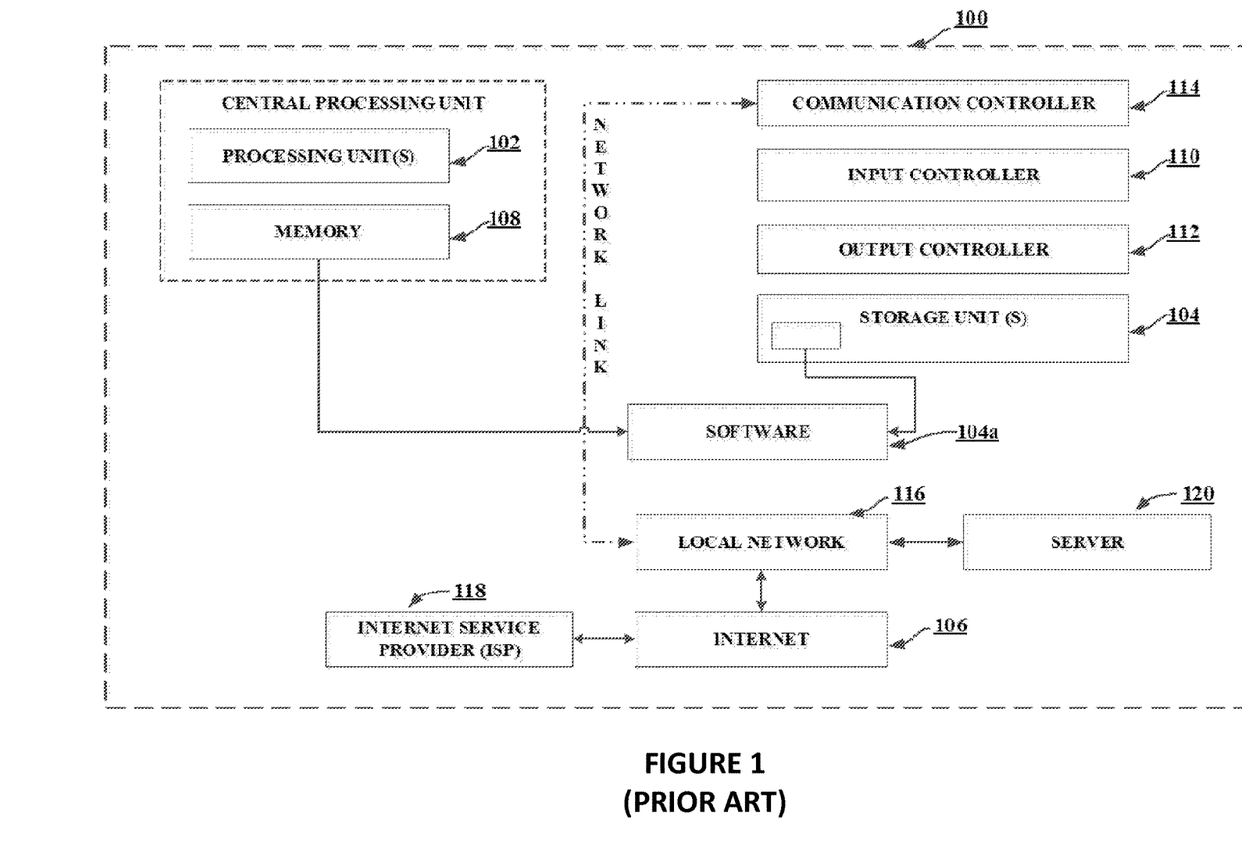
FIG. 1 illustrates a computing system for implementing gamification according to some embodiments of the invention.

FIG. 1 (PRIOR-ART) is a block diagram of a computing device 100 to which the present disclosure may be applied according to an embodiment of the present disclosure. The system includes at least one processor 102, designed to process instructions, for example computer readable instructions (e.g. code) stored on a storage device 104. By processing instructions, processing device 102 may perform the steps and functions disclosed herein. Storage device 104 may be any type of storage device, for example, but not limited to an optical storage device, a magnetic storage device, a solid state storage device and a non-transitory storage device. The storage device 104 may contain software 104a which is a set of instructions (e.g. code). Alternatively, instructions may be stored in one or more remote storage devices, for example storage devices accessed over a network or the internet 106. The computing device also includes an operating system and microinstruction code. The various processes and functions described herein may either be part of the microinstruction code or part of the program (or combination thereof) which is executed via the operating system. Computing device 100 additionally may have memory 108, an input controller 110, and an output controller 112 and communication controller 114. A bus (not shown) may operatively couple components of computing device 100, including processor 102, memory 108, storage device 104, input controller 110, output controller 112, and any other devices (e.g., network controllers, sound controllers, etc.). Output controller 112 may be operatively coupled (e.g., via a wired or wireless connection) to a display device (e.g., a monitor, television, mobile device screen, touch-display, etc.) in such a fashion that output controller 112 can transform the display on display device (e.g., in response to modules executed). Input controller 110 may be operatively coupled (e.g., via a wired or wireless connection) to input device (e.g., mouse, keyboard, touch-pad, scroll-ball, touch-display, etc.) in such a fashion that input can be received from a user. The communication controller 114 is coupled to a bus (not shown) and provides a two-way coupling through a network link to the internet 106 that is connected to a local network 116 and operated by an internet service provider (hereinafter referred to as 'ISP') 118 which provides data communication services to the internet. Network link typically provides data communication through one or more networks to other data devices. For example, network link may provide a connection through local network 116 to a host computer, to data equipment operated by an ISP 118. A server 120 may transmit a requested code for an application through internet 106, ISP 118, local network 116 and communication controller 114. Of course, FIG. 1 illustrates computing device 100 with all components as separate devices for ease of identification only. Each of the components may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 100 may be one or more servers, for example a farm of networked servers, a clustered server environment, or a cloud network of computing devices.

Figure 2:
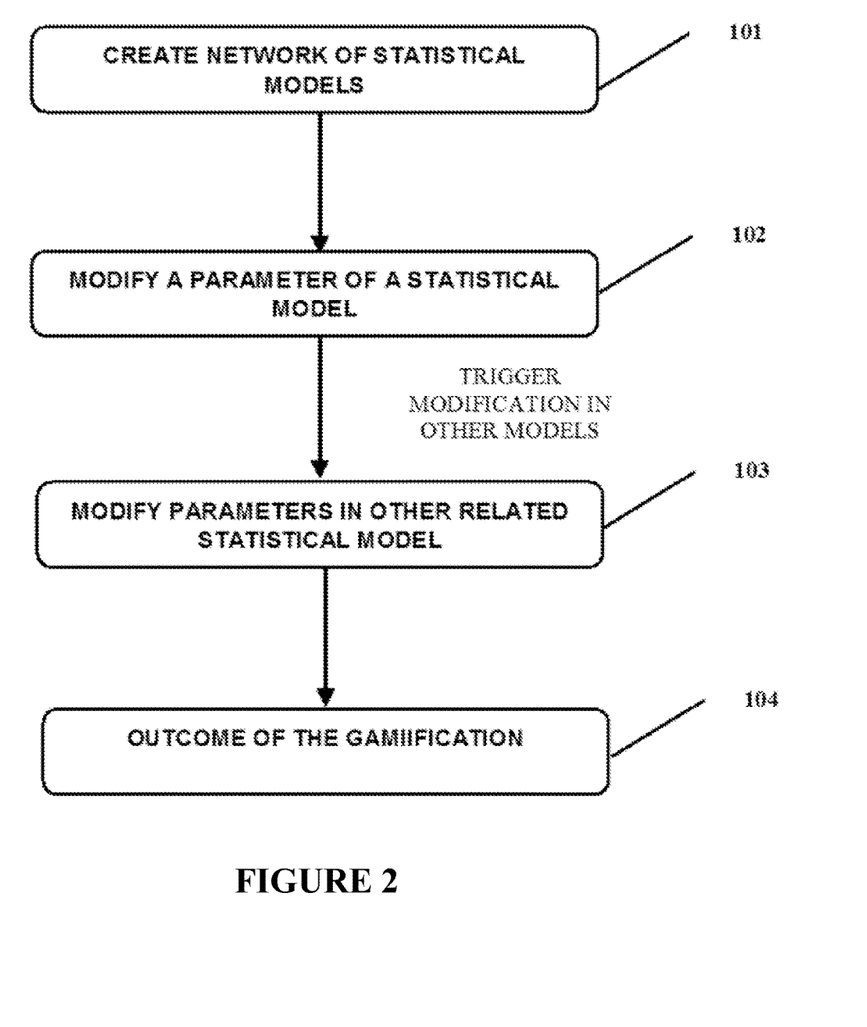
FIG. 2 illustrates a flow diagram for the preferred embodiment of the invention

FIG. 2 describes a method of dynamic gamification over a network and comprises of the steps of creating a network of statistical models associated with a real life situation by using a processor (101), modifying a predefined parameter of a first statistical model by either a player or a moderator (102) which triggers a modification subsequently in the other statistical models related to the first statistical model (103) and deciding an outcome of the gamification in response to the modification of the first and the other statistical models (104).

Figure 3:
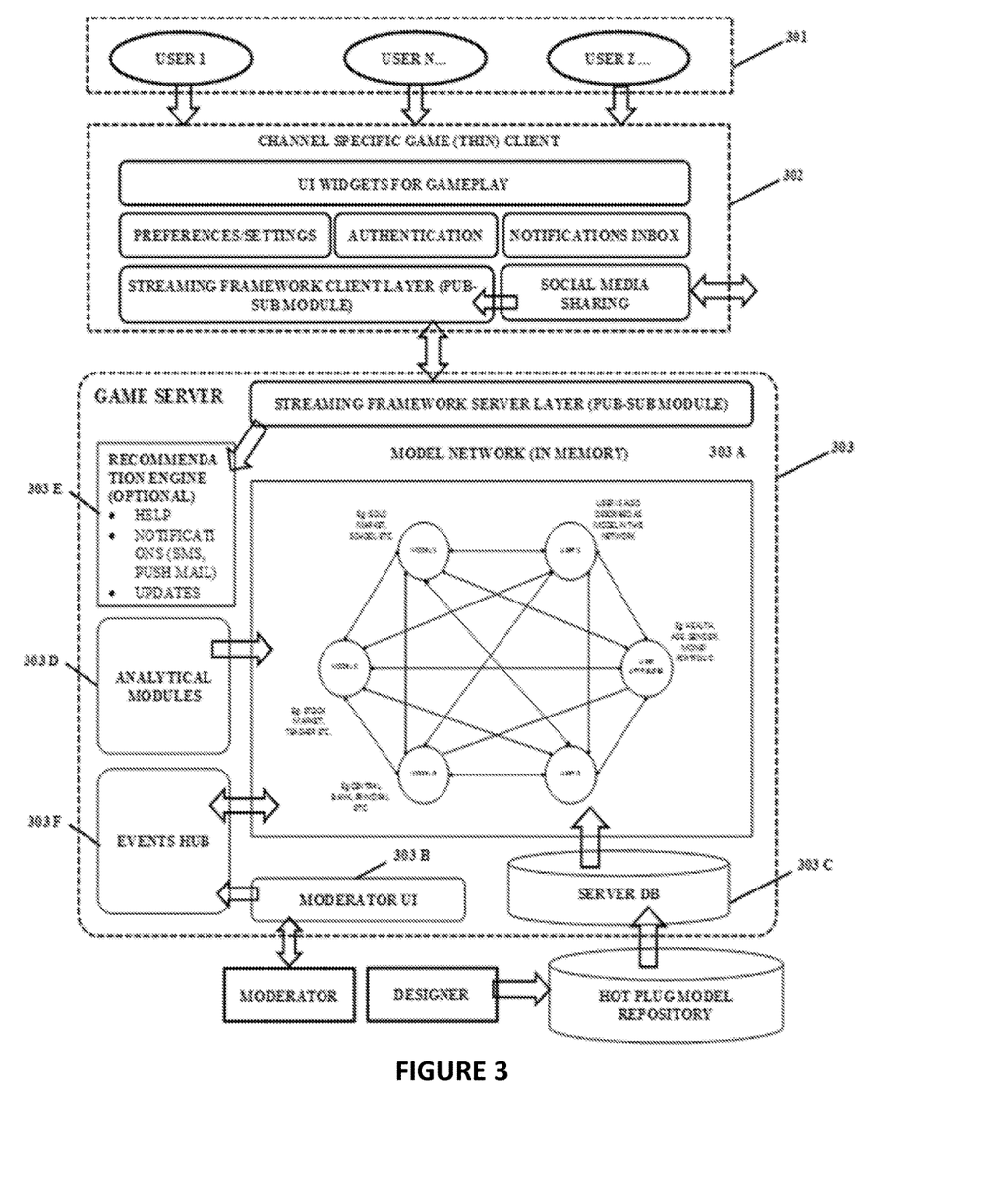
FIG. 3 illustrates a gamification system as implemented in the invention described herein.

FIG. 3 describes the system architecture diagram of a model network 303 A (models could be a school, stock market, bank etc.) inter-connected with a server database 303 C to record user activities/inputs (starting a new business, buying a property etc.), moderator user interface 303 B to create biases or to increase degree of randomness in the system, analytical modules 303 D to provide insights to the users. All the changes simulated by the actions of the player pass through an event hub 303 F (adding a new entity in the system, deleting an existing model etc.). The network could be connected to a recommendation engine 303 E to provide suggestions (like default investment plans, top rated commodity etc.) to the players. The system also offers a social media sharing engine which enables the players to share, monitor and compare their activities. The system 303 is the heart of the whole gamification network model and interacts with other sub-systems 301, 302 through wired or wireless communication medium for receiving inputs from the gaming entities like players, moderator, social media engine etc.

An exemplifying embodiment of such type of system could be a multi-player game where system generates its intelligence by the changes arising due to collective actions of the players. Considering a financial scenario if a group of players buy property in a particular area, it would result in increase in the price index of all the commodities as these are related to land prices. This scenario would drive other players to move to different areas thus opposing the earlier direction system was progressing and moving the system into a new direction based on the strategy and inputs from other players. Players have the independence to take breaks which could extend from weeks to months and can reconnect with the system at any time.

The structure of the gamification as described and interpreted in the present invention is described here below.

In a preferred embodiment, the system comprises of the following fundamental components/attributes:

Time scale: In most strategy games the time inside the game is not necessarily reflective of the time in real world. The progression of time can be set to be much shorter or longer that the time in real world. This is useful because outcome of a chosen action or overall strategy is visible with passage of time. The time keeping is important because it holds the game together as an axis.

Model descriptor: Models manifest as dynamic but passive (as a player) entities in a game. They are something that change and have a distinct representation inside a game but they are not themselves players.

For example, in educational game for school kids the model may represent school, principal or teacher. In a finance game the model may represent stock exchange, government or central bank.

The models are described in a meta language (can be xml based) so that they can be interpreted by the core system and represented in memory. Model may have attributes with fixed, variable or randomly variable values.

The models are represented to the players through the graphical user interface. The players cannot directly alter the model attributes. However, they can observe and react to these attributes by taking specific actions (e.g. make a move) permissible by the game user interface.

It is required for the state of these models to be archived. It may be useful in representation in user interface (e.g. stock index price) or for correlating with player behavior.

Network descriptor: A network descriptor is a graph (data structure) representation of relationship between models. A graph is traditionally described as a set of nodes and edges. Here the nodes are models and the edges are relationships between them. The network may be stored in a graph database or represented otherwise (e.g. in an xml file), depending on implementation.

Two nodes may be joined by one or more links, as may be chosen in the implementation. The links are basically mathematical equations created by game designers. They may be simple linear or involving multiple variables or even having a random variable. The value of these variables might be the values of the specific attributes of the models that the edge is linking. There may be certain global variables that can be part of the equation as well.

The equations can be updated by game designers anytime. The network is not explicitly obvious to the user and for intriguing game play it should not be predictable either.

The network state is not required to be archived (unless there is a requirement that players can move back in time).

Player model: Players are the actual actors. They are modeled in the system like models described above. These can also be added to the system or modified as the game progresses. For the new attributes the data will obviously be captured from the time they are introduced.

There could be homogeneous player models of different types of players depending on the game storyline. For example, there could be distinct buyer or sellers in a trade related game of there could be hobbits or elves in a fantasy strategy game.

The models being discussed here are not representation of the rendering information (though rendering information can be part of the model attributes). The models capture the being of the player (e.g. health, score, transactions, weapons, powers, job, age, sex, bank balance, family, friends etc.).

It is necessary for player models to be archived in time. This is required because the historical analysis is employed for behavior pattern detection. The analysis may involve part of the model data or whole of it over any slice of time.

Real time response to player actions: The changes in the network models are triggered by the individual actions of the players. These changes are propagative in nature as changes in one network model would lead to changes in the others. The actions of players are directly fed into the model network using the pre-established mathematical relationships. Each action is represented by a set of formulas involving one or more attributes of each model instance.

Actions of different players when processed by the model in real time have the effect of putting the feedback system in constant motion. This generates new situations for players to respond to. For example, lot of players buying a land in a certain area may result in the increase in the prices of land in that area. Also this may affect the interest rates offered by the bank on home loans. A large population of players being like this may prompt the game moderator to publish an article/news in the game's virtual newspaper.

Moderator model: A moderator model is a special model in the system that overlays the network of models described above. It exposes some relationships and model attributes partially or fully to the moderator by masking others.

A game designer may enable more or less controls for the moderator over a period of time.

The moderator is generally provided a user interface (or he could control through configuration text files) to tweak the controls. These controls may be in forms of sliders, dials, drop down values or free text/content that is published to the game world.

The moderator may also be provided with a game sentiment, attrition and activity dashboard based on behavioral pattern mining and general system analytics. He may also be provided with a dashboard type control for models in the network so that he can tweak them through the exposed controls and relationships.

Game Server: This is the main game process that loads all the descriptors into memory when the game is started up. It provides data storage, archival, host analytical modules, user interfaces and manages communications and events between the game interface and players, models, relationships and networks. It may also be noted here that the network may also utilize the cloud services provided by a gamification service provider and is not restricted to the conventional network.

The changes made by the moderator, and gamification data is stored on a storage database, the storage database being associated with the computer network. In an even where the user may become offline due to a network disruption or due to a voluntary act of anonymity, the storing of gamification data is done on a local system. This locally stored data is synced with the gamification storage database upon reconnection to the server.

In a preferable embodiment It contains the following infrastructure components.

Bi-Directional Streaming Framework:

The real time game play paradigm mandates that there is virtually a live connection between the game server and the individual clients. The server's updates (driven by changes to network, models, moderator actions etc) should reach game clients in a fraction of a second. Similarly, players updates should reach servers and should be aggregated analytically (individual and group indicators computed in a matter of seconds).

In order to achieve this, a perennial connection between game clients (when the player is logged in or even when the player has chosen to receive messages via sms, push notifications, emails etc for e.g.) and server is required. This is provided by a bi-directional streaming (data push) framework.

An example of this will be an implementation of publisher-subscriber pattern over HTTP using XMPP extensions. Depending on the target device and underlying network a different set of technologies could also be used.

Events Hub:

There is a lot of message passing in the system because the models are all interdependent. The Events Hub is a central hub for all events (like change in a model) and it distributes the events to observers of the messaging entity. This events hub needs to be high throughput and low latency because even a small change in one attribute of one model will trigger a multitude of updates which will propagate for eternity in theory. So the volume of messages crisscrossing is always going to rise exponentially.

To prevent a perpetual cycle of update triggers choking the system, thresholds can be defined in formula, to take into account the distance (no of hops between graph nodes) it can travel, time of expiry of trigger from the point of origination, delta thresholds etc.

The events hub is saleable across multiple machines.

This is another manifestation of the publisher-subscriber pattern in the system and can be implemented by a low latency, high throughput (or highly scale-able) message queue.

Channel Specific User Interface:

Depending on the number of channels/devices required to be supported, the user interface for game clients, including moderators console can be developed.

In addition to the above, there may be a possibility wherein the system may not be connected to the network as described above for a certain period of time. In such a scenario the system may sustain itself and provide gamification activities to the user until the next polling is bound to happen in time or state to achieve the real time status for the gamification system. The game data during this period is stored locally and may be synchronized with the server on reconnection.

In addition to or in conjugation with the description of the invention with respect to the drawings enclosed herein, embodiments of the present invention also disclose the aspects as described above. Although the description above is directed towards explaining the invention in view of a gamification platform for a real world scenario, the same can be extended to other scenarios and application as well.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A computer-implemented method executed by one or more computing devices for dynamic gamification over a computer network, wherein each of the one or more computing devices comprises one or more processors and one or more computer readable medium storing computer executable instructions that, when executed on the respective one or more processors, cause the respective computing device to execute at least a portion of the method, the method comprising:

creating, by at least one of the one or more computing devices, a network of statistical models associated with a gamification scenario, the statistical models described in a meta language and having a plurality of attributes affecting gamification outcomes, the statistical models of the network being represented as interconnected nodes, relationships between nodes being stored in a network descriptor;

modifying, by at least one of a first player of a plurality of players and a moderator, using at least one of the one or more computing devices, a predefined parameter of a first statistical model;

triggering, by at least one of the one or more computing devices based at least in part on the modification of the predefined parameter of the first statistical model, a modification subsequently in one or more parameters of a second statistical model, the second statistical model being related to the first statistical model, the first and second statistical models being joined by one or more links, wherein a link of the one or more links associates the predefined parameter of the first statistical model and the one or more parameters of the second statistical model such that the modification to the predefined parameter of the first statistical model of the gamification scenario modifies the one or more parameters of the second statistical model of the gamification scenario, thus at least in part affecting a gamification outcome using the second statistical model;

repeating the modifying and triggering for at least the first statistical model and the second statistical model based on gamification actions of the plurality of players, wherein the network of statistical models provides more realistic gamification than a single, isolated statistical model or involvement of a single player;

deciding, by at least one of the one or more computing devices, a gamification outcome based at least in part on the modifications of the first statistical model and the second statistical model; and displaying to at least a second player of the plurality of players gameplay that incorporates the gamificiation outcome.

2. The method of claim 1, wherein the moderator is one of a user playing in the gamification platform and an external entity.

3. The method of claim 2, wherein the moderator is provided an interface which allows modification of one or more parameters and relationship of the statistical models.

4. The method of claim 1, wherein the moderator changes the parameters of the statistical models based on the statistical and historical data in response to a notification from the system.

5. The method of claim 1, wherein computing devices associated with users are connected via the computer network.

6. The method of claim 1, wherein the modifications are made by the moderator using at least one of the one of more computing devices, and gamification data is stored on a storage database, the storage database being associated with the computer network.

7. The method of claim 1, further comprising storing gamification data on a local computer system when the computer network is offline.

8. The method of claim 7, wherein the locally stored gamification data is synced with a gamification storage database upon reconnection to the computer network.

9. A system of dynamic gamification over a computer network, the system comprising:
one or more processors; and
one or more memories operatively coupled to at least one of the one or more processors and having instructions stored thereon that, when executed by at least one of the one or more processors, cause at least one of the one or more processors to:
create a network of statistical models associated with a real life situation, the statistical models having a plurality of attributes affecting gamification outcomes, the statistical models of the network being represented as interconnected nodes, relationships between nodes being stored in a network descriptor;
modify, based on instructions received from at least one of a first player of a plurality of players and a moderator, a parameter of a first statistical model;
register the modification of the parameter of the first statistical model with an event hub;
trigger, based at least in part on the modification of the parameter of the first statistical model, a modification subsequently in one or more parameters of a second statistical model, the second statistical model being related to the first statistical model, the first and second statistical models being joined by one or more links, wherein a link of the one or more links associates the predefined parameter of the first statistical model and the one or more parameters of the second statistical model such that the modification to the predefined parameter of the first statistical model of the gamification scenario modifies the one or more parameters of the second statistical model of the gamification scenario, thus as at least in part affecting a gamification outcome using the second statistical model;
repeat the modifying and triggering for at least the first statistical model and the second statistical model based on gamification actions of the plurality of players, wherein the network of statistical models provides more realistic gamification than a single, isolated statistical model or involvement of a single player;
decide a gamification outcome based at least in part on the modifications of the first statistical model and the second statistical model; and
display to at least a second player of the plurality of players gameplay that incorporates the gamification outcome.

10. The system of claim 9, wherein the statistical models comprise entities representing users and objects associated with the real life situation.

11. The system of claim 9, wherein the moderator is one of a user playing in the gamification platform and an external entity.

12. The system of claim 11, wherein the moderator is provided an interface which allows modification of one or more parameters and relationship of the statistical models.

13. The system of claim 9, wherein the instructions received are from a moderator, and gamification data is stored on a storage database, the storage database being associated with the computer network.

14. The system of claim 9, wherein computing devices associated with users are connected to the system through the computer network.

15. The system of claim 9, wherein at least one of the one or more memories has further instructions stored thereon that, when executed by at least one of the one or more processors, cause at least one of the one or more processors to store the modifications and gamification data on a storage database associated with the computer network.

16. The system of claim 9, wherein the gamification data is stored on a local system when the system is offline.

17. The system of claim 16, wherein the locally stored gamification data is synced with a gamification storage database upon reconnection to the computer network.

18. At least one non-transitory computer-readable medium storing computer-readable instructions that, when executed by one or more computing devices, cause at least one of the one or more computing devices to:
create a network of statistical models associated with a gamification scenario, the statistical models having a plurality of attributes affecting gamification outcomes, the statistical models of the network being represented as interconnected nodes;
modify, based on instructions received from at least one of a first player of a plurality of players and a moderator, at least a first attribute of a first statistical model;
trigger, based at least in part on the modification of the at least a first attribute of the first statistical model, a modification subsequently in one or more attributes of a second statistical model, the second statistical model being related to the first statistical model such that the modification to the attribute of the first statistical model of the gamification scenario modifies the one or more attributes of the second statistical model of the gaming scenario, thus as at least in part affecting a gamification outcome of the second statistical model;
repeat the modifying and triggering for at least the first statistical model and the second statistical model based on gamification actions of the plurality of players, wherein the network of statistical models provides more realistic gamification than a single, isolated statistical model or involvement of a single player;

decide a gamification outcome based at least in part on the modifications of the first statistical model and the second statistical model; and display to at least a second player of the plurality of players gameplay that incorporates the gamification outcome.

19. The at least one non-transitory computer-readable medium of claim 18, wherein the statistical models comprise entities representing users and objects associated with the real life situation.

20. The at least one non-transitory computer-readable medium of claim 18, wherein the moderator is one of a user playing in the gamification platform and an external entity.

21. The at least one non-transitory computer-readable medium of claim 20, wherein the moderator is provided an interface which allows modification of one or more parameters and relationship of the statistical models.

22. The at least one non-transitory computer-readable medium of claim 18, wherein the instructions received are from the moderator and are based at least in part on statistical and historical data in response to a notification from at least one of the one of more computing devices.

23. The at least one non-transitory computer-readable medium of claim 18, wherein computing devices associated with users are connected to at least one of the one of more computing devices via a computer network.

24. The at least one non-transitory computer-readable medium of claim 18, wherein the instructions received are from the moderator, and gamification data is stored on a storage database, the storage database being associated with a computer network.

25. The at least one non-transitory computer-readable medium of claim 18, wherein gamification data is stored on a local system.

26. The at least one non-transitory computer-readable medium of claim 25, wherein the locally stored data is synced with a gamification storage database upon reconnection to a computer network.

* * * * *